United States Patent
Jang et al.

(10) Patent No.: US 8,883,272 B2
(45) Date of Patent: Nov. 11, 2014

(54) CELLULOSE ACYLATE FILM

(75) Inventors: Won Seok Jang, Daejeon (KR); Yong Gyun Cho, Daejeon (KR); Won Yeob Kim, Daejeon (KR); Jun Tae Choi, Daejeon (KR); Myoung Lae Kim, Daejeon (KR); Hyuk Jun Kim, Daejeon (KR); Ki Yup Kim, Seoul (KR); Sung Ho Son, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/885,844

(22) PCT Filed: Nov. 18, 2011

(86) PCT No.: PCT/KR2011/008798
§ 371 (c)(1),
(2), (4) Date: May 16, 2013

(87) PCT Pub. No.: WO2012/067441
PCT Pub. Date: May 24, 2012

(65) Prior Publication Data
US 2013/0234083 A1  Sep. 12, 2013

(30) Foreign Application Priority Data
Nov. 18, 2010  (KR) .................. 10-2010-0114782

(51) Int. Cl.
*C09K 19/00* (2006.01)
*C08J 5/18* (2006.01)
*C08K 5/523* (2006.01)
*C09K 21/06* (2006.01)
*C08L 1/12* (2006.01)

(52) U.S. Cl.
CPC . *C09K 21/06* (2013.01); *C08J 5/18* (2013.01); *C08K 5/523* (2013.01); *C08J 2301/12* (2013.01); *C08L 1/12* (2013.01)
USPC ........... 428/1.3; 428/1.1; 428/1.31; 428/1.33; 349/96; 349/117; 106/168.01; 252/601

(58) Field of Classification Search
CPC ...... C08J 5/18; C08J 2301/08; C08J 2301/10; C08J 2301/12; C08J 2301/14; C08K 5/523; C08L 1/08; C08L 1/10; C08L 1/12; C08L 1/14; G02F 1/133634; G02F 1/133528; G02F 1/13363
USPC ............ 428/1.1, 1.3, 1.31, 1.33; 349/96, 117; 106/168.01; 252/601
See application file for complete search history.

(56) References Cited

U.S. PATENT DOCUMENTS

| | | | |
|---|---|---|---|
| 3,703,495 A * | 11/1972 | Jackson et al. | 524/141 |
| 5,969,016 A * | 10/1999 | Weber et al. | 524/127 |
| 6,211,358 B1 | 4/2001 | Honda et al. | |
| 6,239,275 B1 | 5/2001 | Gupta et al. | |
| 2004/0146732 A1 * | 7/2004 | Yamazaki et al. | 428/532 |
| 2004/0247889 A1 | 12/2004 | Nakajima et al. | |
| 2006/0216437 A1 | 9/2006 | Murakami | |

FOREIGN PATENT DOCUMENTS

| | | |
|---|---|---|
| JP | 2002518485 A | 6/2002 |
| JP | 2005512622 A | 5/2005 |
| KR | 1020080014819 A | 2/2008 |
| KR | 1020100060367 A | 6/2010 |

* cited by examiner

*Primary Examiner* — Gwendolyn Blackwell
*Assistant Examiner* — Ruiyun Zhang
(74) *Attorney, Agent, or Firm* — The Webb Law Firm

(57) ABSTRACT

Provided are a cellulose acylate film used for optical compensation and additives used therefor and, more particularly, is a cellulose acylate film with mechanical physical properties, in particular, very improved modulus affecting film durability.

14 Claims, No Drawings

CELLULOSE ACYLATE FILM

TECHNICAL FIELD

The present invention relates to a cellulose acylate film used for optical compensation and relates to a cellulose acylate film with very improved mechanical physical properties.

In addition, the present invention relates to an optical compensation sheet, a polarizing plate, and a liquid crystal display using a cellulose acylate film.

BACKGROUND ART

A cellulose acylate film has strong strength and flame retardant properties and thus, has been used for various pictures or optical materials. A cellulose acylate film has optical anisotropy lower than that of other polymer films, thereby providing a relatively low retardation. Therefore, the cellulose acylate film has been used for the polarizing plate.

In recent years, a demand for multi-functional liquid crystal display, such as improvement to image quality, or the like, has been increased. Therefore, the cellulose acylate film for the polarizing plate that is a material of the liquid crystal display has also required characteristics satisfying the demand.

DISCLOSURE OF INVENTION

Technical Problem

An object of the present invention is to provide a composition for preparing a cellulose acylate film and a cellulose acylate film with much improved mechanical physical properties while having excellent optical physical properties by a plasticizer having a specific structure not used in the related art as a plasticizer.

In addition, another object of the present invention is to provide an optical compensation sheet, a polarizing plate, and a liquid crystal display using a cellulose acylate film.

Solution to Problem

An exemplary embodiment of the present invention relates to a cellulose acylate film with excellent optical physical properties and mechanical physical properties and more particularly, to a cellulose acylate film of which the retardation value within a surface before being stretched is 0 to 10 nm and the retardation value in a thickness direction is 10 to 100 nm.

In more detail, the exemplary embodiment of the present invention relates to a cellulose acylate film of which $R_e(\lambda)$ and $R_{th}(\lambda)$ satisfy the following Equations (I) and (II).

$$0 \leq R_e(550) \leq 10 \text{ and,} \quad (I)$$

$$10 \leq R_{th}(550) \leq 100. \quad (II)$$

In the above Equations, $R_e(\lambda)$ represents an in-plane retardation value (unit: nm) at wavelength $\lambda$ nm and $R_{th}(\lambda)$ represents a thickness-direction retardation value (unit: nm) at a wavelength of $\lambda$ nm.

As additives for satisfying the conditions, the present invention includes a mixture including at least two compounds selected from compounds of the following Chemical Formula 1 as a plasticizer.

[Chemical Formula 1]

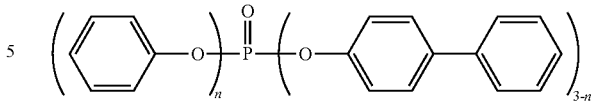

In the above Chemical Formula 1, n represents an integer of 0 to 3 and a case in which n is 1 and a case in which n is 2 are necessarily included.

In more detail, the mixture may include 10 to 30 wt % of the compound of Chemical Formula 1 wherein n is 1 and 70 to 90 wt % of the compound of Chemical Formula 1 wherein n is 2. According to another aspect of the present invention, the mixture may further include 0.1 to 10 wt % of the compound of Chemical Formula 1 wherein n is 0 or 3, by the total content of the mixture.

According to another aspect of the present invention, the mixture may further include 0.1 to 10 wt % of a carboxylic acid ester plasticizer selected from phosphate ester, phthalate ester, and citrate ester, by the total content of the mixture.

The cellulose acylate film according to the exemplary embodiment of the present invention uses 1 to 20 parts by weight of the mixture for every 100 parts by weight of the cellulose acylate.

Hereinafter, each component of the present invention will be described in more detail.

First, describing the cellulose acylate film, in the present invention, the density of the cellulose acylate film is not limited but may be about 1.2 to 1.4.

In the cellulose acylate, a part or all of the hydrogen atoms of hydroxyl group that are present at position 2, position 3, and position 6 of a glucose unit configuring the cellulose are substituted into an acyl group. A substituent of the cellulose acylate may be any acyl groups of which the numbers of carbon atoms are 2 to 20. The degree of substitution of the cellulose acylate that may be used in the present invention is 2.50 to 3.00, preferably, 2.75 to 3.00. The degree of substitution may be measured based on D-817-91 of ASTM.

In addition, the cellulose acylate having at least two acyl groups of which the numbers of carbon atoms are different from each other may also be used. In this case, in the case of the acyl group of which the numbers of carbon atoms are small, an acetyl group may be preferable and the acyl group of which the numbers of carbon atoms are large may also include an aliphatic acyl group such as propionyl, butyryl, or the like, and an aromatic structure, such as benzoyl group, or the like.

In the present invention, the range of the molecular weight of the cellulose acylate is not limited, but a weight-average molecular weight thereof may be in a range of 200,000 to 350,000. In addition, the molecular weight distribution Mw/Mn (Mw represents a weight-average molecular weight and Mn is a number-average molecular weight) of the cellulose acylate is preferably 1.4 to 1.8, more preferably 1.5 to 1.7. In addition, in the present invention, at least two cellulose acylates may be used.

The cellulose acylate film may be prepared by a solvent cast method using a cellulose acylate dope solution. The solvent cast method forms a film by casting a solution (dope) in which the cellulose acylate is dissolved in a solvent to a support and evaporating the solvent.

As a material of the cellulose acylate dope solution, cellulose acylate particles may be used. In this case, 90 wt % or more of the cellulose acylate particles having an average particle size of 0.5 to 5 mm may be used. In addition, 50 wt % or more of the cellulose acylate particles having an average particle size of 1 to 4 mm may be used.

The cellulose acylate particles may have a shape almost approximating a sphere. The cellulose acylate particles are dried so that moisture content thereof is preferably 2 wt % or less, more preferably 1 wt % or less and then, may be prepared as the dope solution.

Next, additives used for the cellulose acylate film will be described.

The cellulose acylate solution (dope) used for the solvent cast method may be added with various kinds of additives according to purposes during each preparation process, for example, additives, such as a plasticizer, an ultraviolet absorber, a degradation inhibitor, a fine particle, a stripper, an infrared absorber, an optical anisotropic control agent, or the like. A detailed kind of the additives may be used without being limited if the additives are usually used in the corresponding fields and the content thereof may be used in a range in which the physical properties of the film are not degraded. Time when additives are added is determined according to the kind of additives. A process of adding additives to a final process of preparing dope may also be performed.

The plasticizer is used so as to improve the mechanical strength of the film and the drying process time of the film may be shortened when the plasticizer is used.

The present inventors completed the present invention through the discovery that the mechanical strength is much improved when compounds having a specific structure are used as the plasticizer. In this case, the present invention is characterized in that the mixture including at least two compounds selected from compounds of the following Chemical Formula 1 is included as the plasticizer.

[Chemical Formula 1]

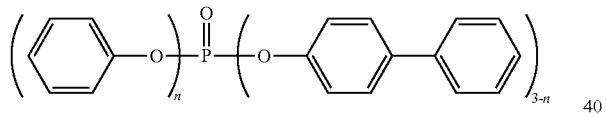

In the above Chemical Formula 1, n represents an integer of 0 to 3 and a case in which n is 1 and a case in which n is 2 are necessarily included.

In more detail, the present inventors completed the present invention through the discovery that the mechanical physical properties are much improved by using the mixture including at least two compounds selected from the above Chemical Formula 1 as the plasticizer, as compared with using one compound alone as the plasticizer.

The present invention is characterized in that biphenyl-4-ol diphenyl phosphate (BDP), in particular, when n is 2, among the compounds of the Chemical Formula 1 is selectively included. The present inventors found that the mechanical physical properties are very improved by mixing the compound of Chemical Formula 1 wherein n is 2 with the compound of Chemical Formula 1 wherein n is 1 at an appropriate ratio as compared with using the compounds alone.

In more detail, the mixture may include preferably 10 to 30 wt %, more preferably 11 to 25 wt % of the compound of Chemical Formula 1 wherein n is 1 and 70 to 90 wt %, more preferably 72 to 88 wt % of the compound of Chemical Formula 1 wherein n is 2.

According to another aspect of the present invention, the mixture may further include preferably 0.1 to 10 wt %, more preferably 0.5 to 5 wt % of the compound of Chemical Formula 1 wherein n is 0 or 3, by the total content of the mixture.

According to another aspect of the present invention, the mixture may further include preferably 0.1 to 10 wt %, more preferably 0.5 to 5 wt % of a carboxylic acid ester plasticizer selected from phosphate ester, phthalate ester, and citrate ester, by the total content of the mixture. In detail, for example, triphenyl phosphate may be used.

In the present invention, the compound of the above Chemical Formula 1 may be embodied as the following compounds.

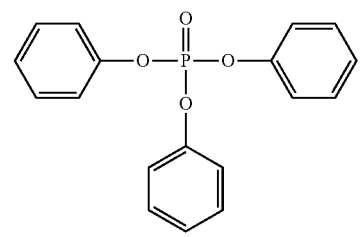

1-1

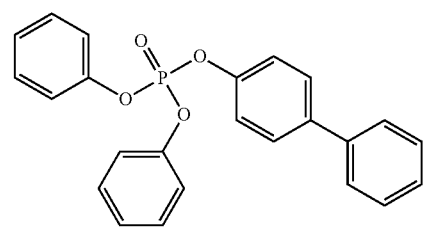

1-2

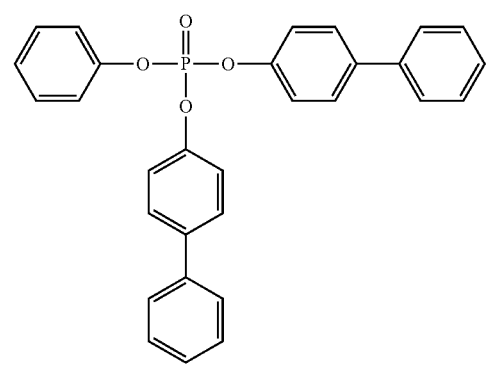

1-3

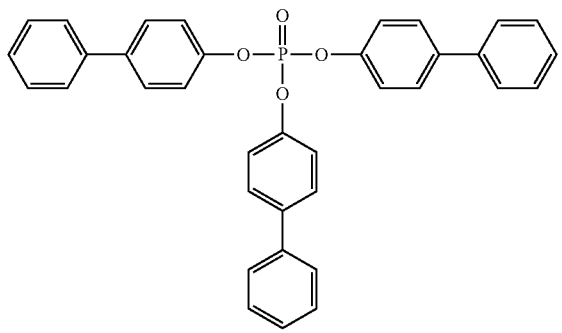

1-4

The mixture may be prepared by the following preparing method.

The mixture may be prepared by a method including a first dehydrochloric acid reaction process of mixing and reacting phosphoryl chloride ($POCL_3$), 4-phenylphenol, and a catalyst and a second dehydrochloric acid reaction process of adding and reacting phenol.

In more detail, at the first dehydrochloric acid reaction process, the content of the phosphoryl chloride is controlled so that the molar ratio of a sum of the 4-phenylphenol at the first dehydrochloric acid reaction process and the phenol at the second dehydrochloric acid reaction process is 1:2.7 to 1:3.0. When the molar ratio is too low, the yield of the biphenyl-4-ol diphenyl phosphate (BDP), the compound of the above Chemical Formula 1 wherein n is 2, is decreased and when the molar ratio exceeds, the phenol may remain due to non-reaction.

In addition, in the present invention, the molar ratio of the 4-phenylphenol at the first dehydrochloric acid reaction process and the phenol at the second dehydrochloric acid reaction process is controlled so as to be 1:1.8 to 1:3.0. When the molar ratio less than the range is used, there may be a risk of volatilizing chloride gas and when the molar ratio exceeding the range is used, there may be a risk of generating non-reaction residues of the 4-phenylphenol.

The catalyst at the first dehydrochloric acid reaction process may include anhydrous aluminum chloride, anhydrous aluminum fluoride, anhydrous magnesium chloride, anhydrous magnesium fluoride, anhydrous manganese chloride, anhydrous manganese fluoride, anhydrous ferrous chloride, anhydrous ferric chloride, anhydrous ferrous fluoride, and/or anhydrous ferric fluoride.

The first dehydrochloric acid reaction process is performed at −20 C to 0 C. When the reaction temperature exceeds 0 C, the hydrochloric acid gas and the phosphoryl chloride generated by the dehydrochloric acid reaction may be volatilized or the non-reaction phenol may remain and the selectivity of the biphenyl-4-ol diphenyl phosphate (BDP), the compound of the above Chemical Equation 1 wherein n is 2, may be reduced.

In addition, the second dehydrochloric reaction process may be performed at preferably 20 C to 50 C, more preferably 25 to 50 C. When out of the reaction temperature range, the reaction speed may be reduced or the residues may be generated due to non-reaction.

The cellulose acylate film according to the exemplary embodiment of the present invention uses 1 to 20 parts by weight of the mixture for every 100 parts by weight of the cellulose acylate. When the cellulose acylate film uses the mixture less than 1 part by weight, the effect is insignificant and when the cellulose acylate film uses the mixture above 20 parts by weight, an appearance of the film may be seriously damaged due to bleedout, or the like.

The present invention may further add the plasticizer usually used, if necessary, in addition to the mixture of the above Chemical Formula 1. An example of the plasticizer may include a carboxylic acid ester plasticizer selected from phosphate ester, phthalate ester, and citrate ester. As an example of the phosphate ester may include triphenyl phosphate (TPP), biphenyl diphenyl phosphate, and tricresyl phosphate (TCP), or the like. An example of the phthalate ester may include dimethyl phthalate (DMP), diethyl phthalate (DEP), dibutyl phthalate (DBP), dioctyl phthalate (DOP), diphenyl phthalate (DDP), and diethyl hexyl phthalate (DEHP), or the like. An example of the citrate ester may include o-acetyl triethyl citrate (OACTE) and o-acetyl tributyl citrate (OACTB), or the like. Another example of the carboxylic acid ester may include butyl oleate, methyl acetyllysine oleate, dibutyl cebacate, and various trimellitate ester. Preferably, the phthalate ester (DMP, DEP, DBP, DOP, DPP, DEHP) plasticizer may be used. The content of the plasticizer may be 0.1 to 10 wt %, by the total content of the mixture.

As the ultraviolet (UV) absorber, hydroxybenzophenone-based compound, benzotriazole-based compound, salicylic acid ester-based compound, cyanoacrylate-based compound, or the like, may be used. The amount of the ultraviolet absorber may preferably be 0.1 to 3 parts by weight, more preferably 0.5 to 2 parts by weight for every 100 parts by weight of the cellulose acylate.

As the degradation inhibitor, an anti-oxidant, a hydroperoxide decomposer, a radical inhibitor, a metal inactivating agent, an oxygen scavenger, and/or a light stabilizer (hindered amine, or the like) may be used. In particular, an example of the preferred degradation inhibitor may include butylated hydroxyl toluene (BHT) and tribenzyl amine (TBA). The amount of the degradation inhibitor may preferably be 0.01 to 5 parts by weight, more preferably 0.1 to 1 parts by weight for every 100 parts by weight of the cellulose acylate.

The fine particle is added so as to suppress a curl of the film, maintain transferability thereof, prevent adhesion in a roll type thereof, or maintain scratch resistance thereof well and may use any one selected from inorganic compounds and organic compounds. For example, an example of the inorganic compounds may preferably include compounds containing silicon, silicon dioxide, titanium oxide, zinc oxide, aluminum oxide, barium oxide, zirconium oxide, strontium oxide, antimony oxide, tin oxide, tin antimony oxide, calcium carbonate, talc, clay, calcined kaolin, calcined calcium silicate, hydrated calcium silicate, aluminum silicate, magnesium silicate, calcium phosphate, or the like, more preferably inorganic compounds containing silicon or zirconium oxide, or the like. The fine particle may have an average primary particle size of 80 nm or less, preferably 5 to 80 nm, more preferably 5 to 60 nm, most preferably 8 to 50 nm. When the average primary particle size exceeds 80 nm, the surface flatness of the film is damaged.

The retardation additives may be used without being limited if they can be used in the cellulose acylate film field and the content thereof may be 1 to 20 parts by weight for every 100 parts by weight of the cellulose acylate. A phase difference needed in the range may be revealed.

In addition, the optical anisotropic control agent, the wavelength dispersion control agent, or the like, may be further added, if necessary. The additives may be used without being limited if they may be usually used in the corresponding fields.

Next, a method for preparing a cellulose acylate film according to the present invention will be described.

In order to prepare the cellulose acylate film according to the present invention, the following cellulose acylate composition, that is, the dope solution is prepared.

The cellulose acylate composition may include 1 to 20 parts by weight of the mixture including at least two compounds selected from the compounds of the following Chemical Equation 1 as the plasticizer for every 100 parts by weight of the cellulose acylate.

[Chemical Formula 1]

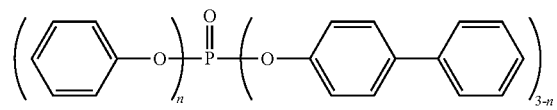

In the above Chemical Formula 1, n represents an integer of 0 to 3 and a case in which n is 1 and a case in which n is 2 are necessarily included.

In more detail, the mixture may include 10 to 30 wt % of the compound of Chemical Formula 1 wherein n is 1 and 70 to 90 wt % of the compound of Chemical Formula 1 wherein n is 2. According to another aspect of the present invention, the mixture may be further include 0.1 to 10 wt % of the compound of Chemical Formula 1 wherein n is 0 or 3, by the total content of the mixture.

According to another aspect of the present invention, the mixture may further include 0.1 to 10 wt % of a carboxylic acid ester plasticizer selected from phosphate ester, phthalate ester, and citrate ester, by the total content of the mixture.

In the present invention, the solid concentration of the dope may preferably be 15 to 25 wt %, more preferably 16 to 23 wt %. When the solid concentration of the dope is less than 15 wt %, flowability is too high and as a result, it is difficult to form the film. When the solid concentration of the dope exceeds 25 wt %, the film is hard to be completely dissolved.

In the present invention, the content of the cellulose acylate may be 70 wt % or more, preferably 70 to 90 wt %, more preferably 80 to 85 wt % of the total solid contents. In addition, the cellulose acylate, or a mixture of at least two cellulose acylates of which a degree of substitution, a degree of polymerization, or a molecular weight distribution is different from each other may be used.

When the film is manufactured by the solvent casting method, as a solvent for preparing the cellulose acylate composition (dope), an organic solvent may be preferable. As the organic solvent, halogenated hydrocarbon may be used. An example of the halogenated hydrocarbon may include chlorinated hydrocarbon, methylene chloride, and chloroform. Among other, it is most preferable to use the methylene chloride.

In addition, an organic solvent in addition to the halogenated hydrocarbon may also be mixed. An example of the organic solvent in addition to the halogenated hydrocarbon may include ester, ketone, ether, alcohol, and hydrocarbon. As the ester, methyl formate, ethyl formate, propyl formate, pentyl formate, methyl acetate, ethyl acetate, pentyl acetate, or the like, may be used, as the ketone, acetone, methyl ethyl ketone, diethyl ketone, diisobutyl ketone, cyclo pentanone, cyclo hexanone, methyl cyclo hexanone, or the like, may be used, as the ether, diisopropyl ether, dimethoxy methane, dimethoxy ethane, 1,4-dioxane, 1,3-dioxolane, tetrahydrofuran, anisole, penetol, or the like, may be used, and as the alcohol, methanol, ethanol, 1-propanol, 2-propanol, 1-butanol, 2-butanol, t-butanol, 1-pentanol, 2-methyl-2-butanol, cyclohexanol, 2-fluoro-ethanol, 2,2,2-trifluoro-ethanol, 2,2,3,3-tetrafluoro-1-propanol, or the like, may be used.

More preferably, the methylene chloride may be used as a main solvent and the alcohol may be used as a sub-solvent. In detail, a mixture of the methylene chloride and the alcohol of a weight ratio of 80:20 to 95:5 may be used.

The cellulose acylate composition may be prepared according to a normal temperature, high temperature, or low temperature dissolution method.

The viscosity of the cellulose acylate composition may preferably be 1 to 400 Pa·s, more preferably 10 to 300 Pa·s at 40° C.

The cellulose acylate film may be prepared by a solvent casting process commonly used in the related art. More particularly, the dope (cellulose acylate composition) prepared as described above may be temporarily stored in a storage tank and undergo defoaming to remove foam in the dope. The defoamed dope flows out of a dope outlet, and passes through a pressure type metering gear pump that feeds the dope at high precision, in a predetermined amount depending upon revolutions of the pump, to a pressure type die. Then, the dope is uniformly casted on a metal support under endless driving through a spinneret (slit) of the pressure type die, to peel the still wet dope film (or referred to as 'web' from the support, at a releasing point on which the metal substrate reaches after almost taking a turn. While fitting both ends of the web into a clip to keep a (predetermined) width thereof, the web is fed to a tenter to dry the same, followed by passing through a roller of a dryer to dry the web and winding the dried web around a winder up to a predetermined length.

When applying the solution, the space temperature may preferably be −50° C. to 50° C., more preferably −30° C. to 40° C., most preferably −20° C. to 30° C. The cellulose acylate solution applied at the low space temperature is instantly cooled on the support to improve gel strength, thereby obtaining a film in which a large amount of organic solvent remains. Therefore, the film may be stripped from the support in a short time without evaporating the organic solvent from the cellulose acylate. Gas cooling the space may use general air, nitrogen, argon, or helium. Relative humidity is preferably 0 to 70%, more preferably 0 to 50%.

The temperature of the support (casting part) to which the cellulose acylate solution is applied is preferably −50 to 130° C., more preferably −30° C. to 25° C., most preferably −20° C. to 15° C. In order to cool the casting part, the cooled gas may be introduced into the casting part. A cooler is disposed in the casting part to cool the space. At the time of cooling, it is important that water is not adhered to the casting part. When cooling the casting part by gas, it is preferable to use dry gas.

In addition, the cellulose acylate film may be subjected to surface treatment, if necessary. The surface treatment is generally performed so as to improve adhesion of the cellulose acylate film. An example of the surface treatment method may include glow discharging, UV irradiation, corona discharge, flame treatment, saponification, or the like.

The thickness of the cellulose acylate film is preferably 20 to 140 μm, more preferably 30 to 100 μm.

The cellulose acylate film according to the present invention may be used for the polarizing plate, the optical compensation sheet, and the liquid crystal display. Further, the cellulose acylate film that is stacked in one or at least two sheets may be used.

Advantageous Effects of Invention

The cellulose acylate films according to the exemplary embodiments of the present invention have very improved mechanical properties.

MODE FOR THE INVENTION

Hereinafter, a detailed description of the present invention will be described by way of example, but the present invention is not limited to the following example.

Hereinafter, the physical properties of the film were measured by the following measuring methods.

1) Optical Anisotropy $R_e$ was measured by a birefringent measuring instrument (Product Name: KOBRA-WPR, made from Oji Scientific Instrument) by inputting light of 450 nm, 550 nm, and 700 nm in wavelength, respectively, in a film normal direction. $R_{th}$ was measured by inputting light of 450 nm, 550 nm, and 700 nm in wavelength, respectively, in a direction inclined by 40 with respect to the film normal direction using a slow axis (determined by KOBRA-WPR) within the $R_e$ surface as a slope axis.

2) Haze

For samples of the cellulose acylate films, respectively, the sample having a size of 30 mm×30 mm was prepared and was measured using a haze meter (HM-150 available from MURAKAMI COLOR RESEARCH LABORATORY) according to ASTM-D1003-52.

3) Transmittance

Light transmittance at the wavelength of 550 nm was measured using a spectrophotometer (HM-150 available from MURAKAMI COLOR RESEARCH LABORATORY).

4) Load at Break and Modulus

The load at break and the modulus were measured under 23° C. and 55% RH according to the method described in JIS K 7127. The load at break and the modulus were obtained by cutting the sample by 15 mm in width and 150 mm in length and performing a tensile test at a tensile speed of 50 mm/minute.

5) Strain at Break

The strain at break is a ratio (percentage %) of elongated amount until being fractured by stretching. The measurement may be performed using a tensile tester. The sample having a size of 15 cm in length and 1.5 cm in width in a direction to be measured was prepared. The sample of which the humidity is controlled, with being left for 24 hours under the environment of 25° C. and 60% RH, was stretched under the same conditions to measure the elongation of the sample when being fractured. The tensile speed was set to be 50 mm/minute. The ratio (percentage %) of the elongated amount when being fractured to the length of the sample before being stretched was referred to as the strain at break (%).

Example 1

Preparation of Cellulose Acetate Composition (Dope)

For 100 parts by weight of a cellulose acetate powder having a degree of substitution of 2.87, 0.5 parts by weight of silicon dioxide (average particle size of 16 nm), 0.7 parts by weight of 2(2'-Hydroxy-3',5'-di-t-butylphenyl)-5-chlorobenzotriazole as the ultraviolet absorber, 1.3 parts by weight of 2-(3,5-di-t-amyl-2-hydroxy phenyl)benzo triazole, 440 parts by weight of methylene chloride, 50 parts by weight of methanol, and 5 parts by weight of mixture shown in the following Table 1 as the plasticizer were put in an agitator and dissolved at 30° C. The obtained dope was liquid-transferred to the gear pump after being heated at 30° C., filtered by a filter sheet having an absolute filtering precision of 0.01 mm, and again filtered by a cartridge filtering device having an absolute filtering precision of 5 μm.

Preparation of Cellulose Acetate Film

The dope obtained through the filtering process was casted on a stainless support through the casting die and was stripped. The remaining solvent amount was controlled to be 30 wt % at the time of stripping. After being stripped, the dope was stretched by 2% (the percentage by length) in the film traveling direction by a stretching machine and then, again connected to the tenter so as to be stretched by 3% (length %) in a width direction of the film. After drawn out the film from the tenter, left and right ends of the film were removed by 150 mm. The film of which the ends are removed was dried by a drier and both ends of the film drawn out by the drier were cut by 30 mm and the portions of 10 mm from both ends thereof were again subjected to knurling machining of a height of 100 μm so as to be wound in a roll shape. By preparing the sample of the manufactured film having a thickness of 80 μm, the retardation ($R_{th}$) value in the thickness direction of the cellulose acetate film was measured by the above-mentioned method.

Example 2

Example 2 manufactured a cellulose acetate film by preparing the dope by the same method as Example 1 except that 10 parts by weight of the mixture prepared in the preparation example 1 was used.

Examples 3 to 51

Examples 3 to 5 manufactured cellulose acetate films by preparing the dope by the same method as Example 1 except that the kinds and contents of the mixture used as the plasticizer as shown in Table 1 were changed.

Comparative Examples 1 to 61

Comparative Examples 1 to 6 manufactured cellulose acetate films by preparing the dope by the same method as Example 1 except that the kinds and contents of the plasticizer were changed as shown in Table 1.

TABLE 1

| | Plasticizer | | | Optical Physical Properties | | | |
|---|---|---|---|---|---|---|---|
| | Mixture | | Content in dope | | | | |
| | Kind | Content (wt %) | (parts by weight) | $R_e$ (nm) | $R_{th}$ (nm) | Haze (%) | Transmittance (%) |
| Example 1 | Chemical Formula 1-2 | 86 | 5 | 1.0 | 42.2 | 0.26 | 93.08 |
| | Chemical Formula 1-3 | 13.5 | | | | | |
| | Chemical Formula 1-1 | 0.5 | | | | | |
| Example 2 | Chemical Formula 1-2 | 86 | 10 | 1.2 | 48.6 | 0.28 | 92.35 |
| | Chemical Formula 1-3 | 13.5 | | | | | |
| | Chemical Formula 1-1 | 0.5 | | | | | |
| Example 3 | Chemical Formula 1-2 | 85 | 5 | 1.1 | 48.0 | 0.26 | 95.50 |
| | Chemical Formula 1-3 | 15 | | | | | |

TABLE 1-continued

|  | Plasticizer | | Optical Physical Properties | | | |
|---|---|---|---|---|---|---|
|  | Mixture | Content in dope | | | | |
|  | Kind | Content (wt %) | (parts by weight) | $R_e$ (nm) | $R_{th}$ (nm) | Haze (%) | Transmittance (%) |
| Example 4 | Chemical Formula 1-2 | 82.5 | 5 | 1.2 | 45.6 | 0.28 | 92.68 |
|  | Chemical Formula 1-3 | 16.5 | | | | | |
|  | Chemical Formula 1-4 | 1 | | | | | |
| Example 5 | Chemical Formula 1-2 | 81 | 5 | 0.9 | 40.8 | 0.25 | 93.13 |
|  | Chemical Formula 1-3 | 14 | | | | | |
|  | Chemical Formula 1-1 | 5 | | | | | |
| Comparative Example 1 | — | — | — | 0.4 | 25.3 | 0.20 | 93.65 |
| Comparative Example 2 | Chemical Formula 1-1 | | 5 | 0.5 | 34.2 | 0.26 | 92.98 |
| Comparative Example 3 | Chemical Formula 1-1 | | 10 | 0.7 | 40.5 | 0.28 | 92.54 |
| Comparative Example 4 | Chemical Formula 2 | | 10 | 1.5 | 43.2 | 0.30 | 91.80 |
| Comparative Example 5 | Chemical Formula 3 | | 10 | 1.6 | 43.8 | 0.22 | 93.11 |
| Comparative Example 6 | Chemical Formula 1-2 | | 10 | 1.5 | 52.1 | 0.25 | 93.44 |

As shown in the above Table 1, when the mixture of Chemical Formula 1 is injected as the plasticizer, it could be appreciated that the optical physical properties equivalent to or better than using the compounds of the related art as the plasticizer were shown.

The detailed compounds for Chemical Formulas 1-1, 1-2, 1-3, 1-4, 2, and 3 of the above Table 1 were shown below.

[Chemical Formula 1-1]

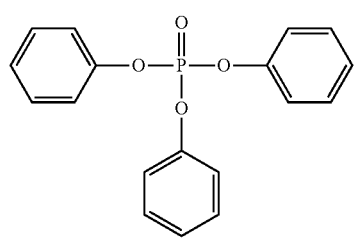

Triphenyl phospate (TPP, when n is 3 in Chemical Formula 1)

[Chemical Formula 1-2]

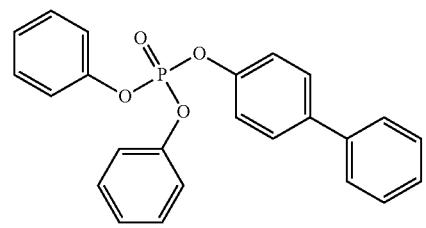

Biphenyl-4-ol diphenyl phosphate (BDP, when n is 2 in Chemical Formula 1)

[Chemical Formula 1-3]

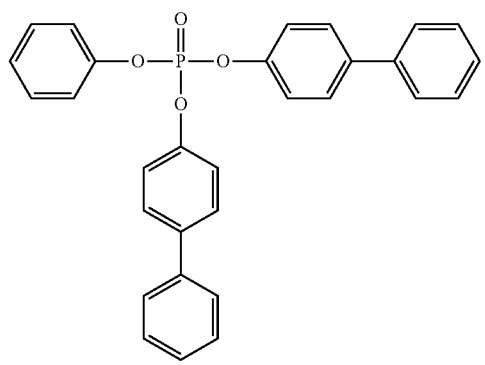

Bis (p-biphenyl) phenyl phosphate (BPP, when n is 1 in Chemical Formula 1)

[Chemical 1-4]

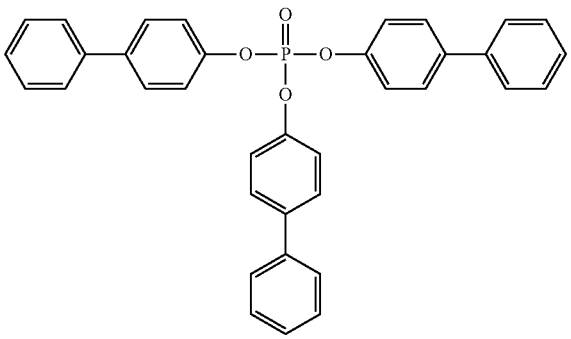

When n = 0 in Chemical Formula 1

[Chemical Formula 2]

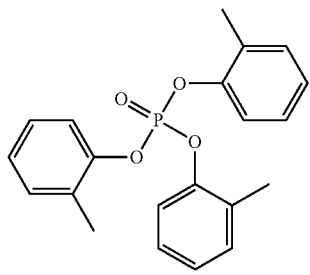

Tri-o-cresyl phosphate

[Chemical 3]

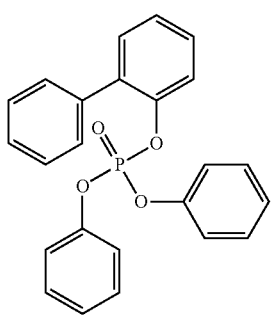

2-Biphenyl diphenyl phosphate

In addition, the mechanical physical properties were measured using the film of Examples and Comparative Examples and the measured results were shown in Table 2.

TABLE 2

|  | Mechanical Physical Properties | | |
| --- | --- | --- | --- |
|  | Load at Break (kgf) | Strain at Break (%) | Modulus (kgf/cm²) |
| Example 1 | 14.25 | 21.5 | 40,925 |
| Example 2 | 15.10 | 22.3 | 42,324 |
| Example 3 | 14.81 | 21.8 | 41,937 |
| Example 4 | 15.03 | 20.7 | 41,112 |
| Example 5 | 14.01 | 20.3 | 39,882 |
| Comparative Example 1 | 11.95 | 15.0 | 34,522 |
| Comparative Example 2 | 12.50 | 16.8 | 35,436 |
| Comparative Example 3 | 12.76 | 17.0 | 35,523 |
| Comparative Example 4 | 13.88 | 14.8 | 36,662 |
| Comparative Example 5 | 13.65 | 18.7 | 37,250 |
| Comparative Example 6 | 13.38 | 19.5 | 37,767 |

As shown in the above Table 2, it was confirmed from Examples 1 to 5 that the mechanical physical properties were much improved as compared with using the plasticizer of the related art.

Further, as shown in Comparative Example 6, in the case in which the compounds when n is 2 were used alone, the mechanical physical properties were not largely improved, as compared with the case in which the mixture of the compounds was used like Examples.

Therefore, as in the present invention, it could be appreciated that the mechanical physical properties were very improved according to the use of the mixture of the compounds when n is 2 and the compounds when n is 1.

INDUSTRIAL APPLICABILITY

The cellulose acylate films according to the exemplary embodiments of the present invention have very improved mechanical properties.

The invention claimed is:

1. A cellulose acylate film, comprising: a mixture including at least two compounds selected from compounds of the following Chemical Formula 1 as a plasticizer:

[Chemical Formula 1]

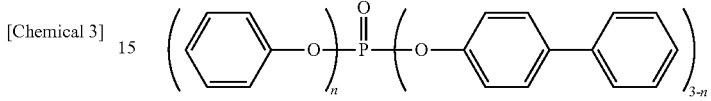

in the above Chemical Formula 1, n represents an integer of 0 to 3 and the compounds wherein n is 1 and n is 2 are included.

2. The cellulose acylate film of claim 1, wherein the mixture includes 10 to 30 wt % of the compound of Chemical Formula 1 when n is 1 and 70 to 90 wt % of the compound of Chemical Formula 1 when n is 2.

3. The cellulose acylate film of claim 2, wherein the mixture further includes 0.1 to 10 wt % of the compound of Chemical Formula 1 when n is 0 or 3, by the total content of the mixture.

4. The cellulose acylate film of claim 3, wherein the mixture further includes 0.1 to 10 wt % of a carboxylic acid ester plasticizer selected from phosphate ester, phthalate ester, and citrate ester.

5. The cellulose acylate film of claim 1, wherein 1 to 20 parts by weight of the mixture is used for every 100 parts by weight of the cellulose acylate.

6. The cellulose acylate film of claim 5, wherein the $R_e(\lambda)$ and $R_{th}(\lambda)$ of the cellulose acylate film before being stretched satisfy the following Equations (I) and (II):

$$0 \leq R_e(550) \leq 10; \text{ and} \quad (I)$$

$$10 \leq R_{th}(550) \leq 100, \quad (II)$$

in the above Equations, $R_e(\lambda)$ represents an in-plane retardation value (unit: nm) at wavelength λnm and $R_{th}(\lambda)$ represents a thickness-direction retardation value (unit: nm) at a wavelength of λnm.

7. An optical compensation sheet including the cellulose acylate film of claim 6.

8. A liquid crystal display including the cellulose acylate film of claim 6.

9. A polarizing plate including the cellulose acylate film of claim 6.

10. A cellulose acylate composition, comprising: 1 to 20 parts by weight of a mixture including at least two compounds selected from compounds of the following Chemical Formula 1 as a plasticizer, for every 100 parts by weight of cellulose acylate:

[Chemical Formula 1]

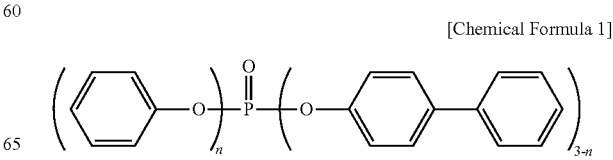

in the above Chemical Formula 1, n represents an integer of 0 to 3 and the compounds wherein n is 1 and n is 2 are included.

11. The cellulose acylate composition of claim 10, wherein the mixture includes 10 to 30 wt % of the compound of Chemical Formula 1 when n is 1 and 70 to 90 wt % of the compound of Chemical Formula 1 when n is 2.

12. The cellulose acylate composition of claim 11, wherein the mixture further includes 0.1 to 10 wt % of the compound of Chemical Formula 1 when n is 0 or 3, by the total content of mixture.

13. The cellulose acylate composition of claim 12, wherein the mixture further includes 0.1 to 10 wt % of a carboxylic acid ester plasticizer selected from phosphate ester, phthalate ester, and citrate ester.

14. The cellulose acylate composition of claim 10, wherein the composition is further added with at least any one or two additives selected from an ultraviolet absorber, a fine particle, a plasticizer, a degradation inhibitor, a stripper, an infrared absorber, and an optical anisotropic control agent.

* * * * *